(12) United States Patent
Barry

(10) Patent No.: US 11,311,000 B2
(45) Date of Patent: Apr. 26, 2022

(54) DEVICE AND METHOD FOR ENHANCING THE FEEDING RESPONSE OF LARVAL FISH

(71) Applicant: Wisconsin Alumni Research Foundation, Madison, WI (US)

(72) Inventor: Terence P. Barry, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 524 days.

(21) Appl. No.: 15/202,294

(22) Filed: Jul. 5, 2016

(65) Prior Publication Data

US 2017/0006840 A1 Jan. 12, 2017

Related U.S. Application Data

(60) Provisional application No. 62/188,892, filed on Jul. 6, 2015.

(51) Int. Cl.
*A01K 63/06* (2006.01)
*A01K 63/04* (2006.01)
*A01K 61/85* (2017.01)

(52) U.S. Cl.
CPC ............ *A01K 63/047* (2013.01); *A01K 61/85* (2017.01); *A01K 63/045* (2013.01); *A01K 63/06* (2013.01); *Y02A 40/81* (2018.01)

(58) Field of Classification Search
CPC ........ A01K 61/00; A01K 61/10; A01K 61/17; A01K 61/80; A01K 61/85; A01K 63/06; Y02A 40/845
See application file for complete search history.

(56) References Cited

U.S. PATENT DOCUMENTS

| | | | | |
|---|---|---|---|---|
| 6,203,170 | B1 * | 3/2001 | Patrick | A01K 79/02 362/234 |
| 6,715,442 | B1 | 4/2004 | Belloma | |
| 7,467,601 | B2 * | 12/2008 | Brauman | A01K 63/04 119/228 |
| 9,016,240 | B2 * | 4/2015 | Delabbio | A01K 61/00 119/200 |

(Continued)

OTHER PUBLICATIONS

"NOAA announces novel feeder for juvenile and larval fishes", Northwest Fisheries Science Center, Mar. 16, 2015, 4 pages.

(Continued)

*Primary Examiner* — Son T Nguyen
(74) *Attorney, Agent, or Firm* — Boyle Fredrickson, S.C.

(57) ABSTRACT

A device and method are provided for enhancing the feeding response of larval fish to feedstock. A food distribution mechanism is positionable above the tank housing the larval fish and is adapted for receiving the feedstock therein. The food distribution mechanism selectively deposits portions of the feedstock into the tank. A light source is positionable adjacent the tank and selectively directs a laser beam at the tank. A controller is operatively connected to the food distribution mechanism and the light source. The controller is configured to actuate the food distribution mechanism for a time period at selected intervals such that the food distribution mechanism deposits a portion of the feedstock into the tank during each time period. In addition, the controller is configured to actuate the light source for at least a portion of each time period.

23 Claims, 2 Drawing Sheets

(56) References Cited

U.S. PATENT DOCUMENTS

| | | | | |
|---|---|---|---|---|
| 2008/0316732 | A1* | 12/2008 | Blake | A01K 63/06 362/101 |
| 2010/0218727 | A1* | 9/2010 | Hughes | A01K 63/00 119/204 |
| 2010/0242846 | A1 | 9/2010 | Kolkovski et al. | |
| 2010/0267126 | A1* | 10/2010 | Jacobs | A01K 63/003 435/292.1 |
| 2011/0039321 | A1* | 2/2011 | Tal | C02F 3/2806 435/167 |
| 2012/0044713 | A1* | 2/2012 | Chiang | A01K 63/06 362/554 |
| 2013/0273599 | A1* | 10/2013 | Robitaille | A01K 61/00 435/39 |
| 2015/0136037 | A1* | 5/2015 | Boonekamp | A01K 61/00 119/226 |
| 2016/0030609 | A1* | 2/2016 | Peterson | A61L 2/08 362/84 |
| 2016/0120157 | A1* | 5/2016 | Vrehen | F21V 23/003 119/267 |
| 2016/0353716 | A1* | 12/2016 | Tanase | A01K 63/06 |
| 2017/0105388 | A1* | 4/2017 | Pfeiff | A01K 5/02 |

OTHER PUBLICATIONS

Barton et al., "Chapter 6—Reproduction and Environmental Biology", Biology, Management, and Culture of Walleye and Sauger, Bethesda, MD: American Fisheries Society, 2011, 34 pages.

Cahu et al., "Substitution of live food by formulated diets in marine fish larvae", Aquaculture 200 (2001) 161-180.

Carvalho et al., "Rearing zebrafish (*Danio rerio*) larvae without live food: evaluation of a commercial, a practical and a purified starter diet on larval performance", Aquaculture Research, 2006, 37, 1107-1111.

Dabrowski, "The feeding of fish larvae: present <<state of the art>> and perspectives (*)", Reprod. Nutr. Develop., 1984, 24 (6), 807-833.

Kvale et al., The problem of meeting dietary protein requirements in intensive aquaculture of marine fish larvae, with emphasis on Atlantic halibut (*Hippoglossus hippoglossus* L.), Aquaculture Nutrition 2007 13: 170-185.

Lee, "Biotechnological advances in finfish hatchery production: a review", Aquaculture 227 (2003) 439-458.

Le Ruyet et al,. "Marine Fish Larvae Feeding: Formulated Diets or Live Prey?", Journal of World Aquaculture Society, vol. 24, No. 2, Jun. 1993, 14 pages.

Planas et al., "Larviculture of marine fish: problems and perspectives" Aquaculture 177 (1999) 171-190.

Sales, "First feeding of freshwater fish larvae with live feed versus compound diets: a meta-analysis", Aquacult Int (2011) 19:1217-1228.

Takeuchi, "A review of feed development for early life stages or marine finfish in Japan", Aquaculture 200 (2001) 203-222.

Teshima et al., "Nutritional assessment and feed intake of microparticulate diets in crustaceans and fish", Aquaculture Research, 2000, 31, 691-702.

Webster et al., "Comparison of Live Brine Shrimp Nauplii and Nonliving Diets as First Food for Striped Bass Larvae", The Progressive Fish-Culturist 52:171-175, 1990.

Wolnicki, "Effects of commercial dry diets and water temperature on growth and survival of northern pike, *Esox lucius* L., larvae", Pol Arch Hydrobiol 44:377-383.

* cited by examiner

DEVICE AND METHOD FOR ENHANCING THE FEEDING RESPONSE OF LARVAL FISH

CROSS-REFERENCE TO RELATED APPLICATIONS

This application claims priority from U.S. Provisional Patent Application Ser. No. 62/188,892, filed on Jul. 6, 2015, the entirety of which is hereby expressly incorporated by reference herein.

FIELD OF THE INVENTION

This invention relates generally to the feeding of larval fish, and in particular, to a device and method for enhancing the feeding response of larval fish to high quality, artificial feedstock.

BACKGROUND AND SUMMARY OF THE INVENTION

Fish hatcheries produce larval and juvenile fish primarily to support the aquaculture industry. Once the juvenile fish reach a suitable size, the fish are transferred to fish farms wherein they are reared to reach harvest size. It can be appreciated that most commercially produced species require a steady supply of high-quality feedstock to optimize the survival, growth, yield and juvenile quality of the fish. Further, it is noted that nutritional requirements are species specific and also vary within the larval stage. Fish are commonly fed with live prey, such as rotifers and brine shrimp (artemia). The production of live feed on-site or buying-in is one of the biggest costs for hatchery facilities, since maintaining these live cultures is labor intensive. As such high quality, artificial larval fish diets have been developed. While reducing the costs associated with live feed production and increasing the consistency of the nutrition provided to the larval fish, these artificial feeds often result in the decreased growth and survival of the larval fish. As such, these artificial feeds cannot normally be used to replace live feed since they do not elicit an appropriate feeding response in most larval fish species.

Therefore, it is a primary object and feature of the present invention to provide a device and method for enhancing the feeding response of larval fish to artificial feedstock.

It is a further object and feature of the present invention to provide a device and method for enhancing the feeding response of larval fish to artificial feedstock which may be simply and easily incorporated into current aquaculture facilities.

It is a further object and feature of the present invention to provide a device for enhancing the feeding response of larval fish to artificial feedstock which is simple to operate and inexpensive to manufacture.

In accordance with the present invention, a device is provided for enhancing the feeding response of larval fish to feedstock. A food distribution mechanism is positionable above the tank housing the larval fish and is adapted for receiving the feedstock therein. The food distribution mechanism selectively deposits portions of the feedstock into the tank. A light source is positionable adjacent the tank and selectively directs a laser beam at the tank. A controller is operatively connected to the food distribution mechanism and the light source. The controller is configured to actuate the food distribution mechanism for a time period at selected intervals such that the food distribution mechanism deposits a portion of the feedstock into the tank during each time period. In addition, the controller is configured to actuate the light source for at least a portion of each time period.

The device may also include a support operatively connected to the food distribution mechanism and the light source for supporting the food distribution mechanism and the light source at a location above a water level of water received in the tank. A diffuser may be positioned between the light source and the tank. The diffuser redistributes the laser beam into a desired pattern. The laser beam emitted by the light source may have a predetermined wavelength in the range of 600 and 700 nanometers or in the range of 490 and 560 nanometers. It is contemplated for each time period to in the range of 0.5 to 10 minutes. Each time period has a starting point and the light source is actuated by the controller at points in time spaced from the starting point of each time period. Further, the length of each time period may be dependent on the species of the larval fish received in the tank. Similarly, the length of each interval may be dependent on the species of the larval fish received in the tank.

In accordance with a further aspect of the present invention, a device is provided for enhancing the feeding response of larval fish to feedstock. The larval fish are receivable in a tank. The device includes a food distribution mechanism positionable adjacent the tank and adapted for receiving the feedstock therein. The food distribution mechanism selectively deposits portions of the feedstock into the tank for a time period. A light source is positionable adjacent the tank. The light source selectively emits a laser beam directed at the tank during at least a portion of the time period. A diffuser is positioned between the light source and the tank. The diffuser redistributes the laser beam into a desired pattern.

A controller is operatively connected to the food distribution mechanism. The controller is configured to actuate the food distribution mechanism for the time period at selected intervals such that the food distribution mechanism deposits a portion of the feedstock into the tank during each time period. The controller is also operatively connected to the light source. The controller is configured to actuate the light source for at least a portion of the time period.

A support is operatively connected to the food distribution mechanism and the light source for supporting the food distribution mechanism and the light source at a location above a water level of water received in the tank. The laser beam emitted by the light source has a predetermined wavelength in the range of 600 and 700 nanometers or in the range of 490 and 560 nanometers. Each time period is in the range of 0.5 and 10 minutes. The time period has a starting point and the light source emits the laser beam at a point in time spaced from the starting point of the time period. The length of the time period is dependent on the species of the larval fish received in the tank.

In accordance with a still further aspect of the present invention, a method is provided of enhancing the feeding response of larval fish to feedstock. The larval fish are receivable in a tank. The method includes the steps of selectively depositing the feedstock into the tank for a time period and selectively directing a laser beam at the tank during at least a portion of the time period. The laser beam is redistributed into a desired pattern.

The step of selectively depositing the feedstock into the tank includes the additional step of actuating a food distribution mechanism for the time period at selected intervals such that the food distribution mechanism deposits a portion of the feedstock into the tank during each time period. The step of selectively directing the laser beam at the tank device includes that step of actuating a light source for at least the portion of each time period. The method may include the additional step of supporting the food distribution mechanism and the light source at a location above a water level of water received in the tank.

It is contemplated for the laser beam to have a predetermined wavelength in the range of 600 and 700 nanometers or in the range of 490 and 560 nanometers. The time period is in the range of 0.5 and 10 minutes and it has a starting point. The laser beam is directed at the tank at a point in time spaced from the starting point of the time period. The length of the time period is dependent on the species of the larval fish received in the tank.

BRIEF DESCRIPTION OF THE DRAWINGS

The drawings furnished herewith illustrate a preferred construction of the present invention in which the above advantages and features are clearly disclosed as well as other which will be readily understood from the following description of the illustrated embodiment.

In the drawings.

DETAILED DESCRIPTION OF THE DRAWINGS

Figure 1:
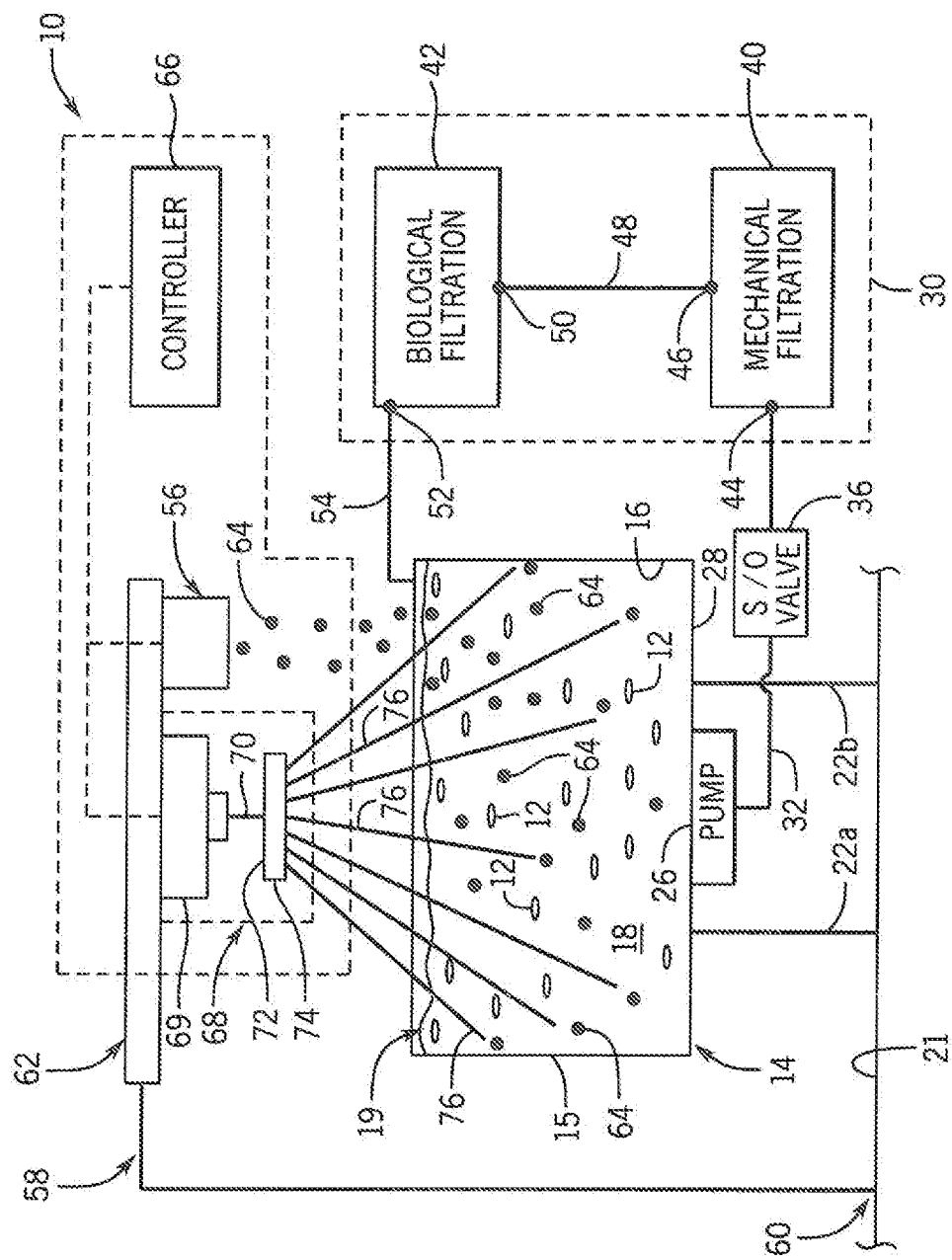
FIG. 1 is a schematic view of a device in accordance with the present invention.

Referring to FIG. 1, a device for enhancing the feeding response of larval fish to feedstock is generally designated by the reference numeral 10. As is conventional, larval fish 12 are receivable in tank 14. By way of example, tank 14 has a generally cylindrical configuration; however, other configurations are possible without deviating from the scope of the present invention. Tank 14 includes sidewall 15 having an inner surface 16 defining interior 18 of tank 14 which is adapted for receiving water 19 therein. Tank 14 is positioned on or supported over a supporting surface 20 in any conventional matter, such as by a plurality of legs 22a and 24b extending from bottom wall 26 thereof.

Tank 14 includes output 26 therein, e.g. in bottom wall 28, to facilitate the recirculation of water 19 in tank 14, as hereinafter described. It is contemplated to provide output 26 in other locations in tank 14, e.g. side wall 15, without deviating from the scope of the present invention. Output 26 of tank 14 is communication with filtration system 30 through pipe or line 32. Pump 34 may be provided in line 22 or interconnect output 26 with line 22 to control the flow of water 19 from tank 14 to filtration system 30. Shut off valve 36 may be provided in line 22 to allow a user to selectively control the flow of water 19 from tank 14 to filtration system 30. More specifically, shut off valve 36 is movable between a first, closed position wherein water 19 in line 22 is prevent from flowing therepast and a second, open position wherein water 19 in line 22 is allowed to flow though shut off valve 36 to filtration system 30.

In order to maintain the optimum growing conditions for larval fish 12 within water 19 of tank 14, filtration system 30 is provided. More specifically, water 19 is pumped from tank 14, through mechanical and biological filtration systems 40 and 42, respectively, of filtration system 30, and returned to tank 14. For example, mechanical filtration system 40 receives water 19 flowing through line 22 at input 44. Water 19 received at input 44 of mechanical filtration system 40 flows through mechanical filtration system 40 wherein solids, such as fecal matter, uneaten feeds, and the like, are removed. The mechanically filtered water 19 exits mechanical filtration system 40 at output 46 and flows to biological filtration system 42 along line 48.

Biological filtration system 42 receives water 19 flowing through line 48 at input 50. Water 19 received at input 50 of biological filtration system 42 flows through biological filtration system 42 wherein beneficial bacteria remove/ detoxify any dissolved toxic wastes and fish excretory products, primarily ammonia, from water 19. As is conventional, biological filtration system 42 may include a media, such as corrugated plastic sheets, beads or sand grains, wherein a film of bacteria grows. This bacteria provides removes the dissolved toxic wastes and fish excretory products in water 19. The filtered water 19 exits biological filtration system 42 at output 52 and is returned to interior 18 of tank 14 through line 54.

It can be appreciated that filtration system 30 heretofore described is merely exemplary and other types of filtration systems may be utilized without deviating from the scope of the present invention. For example, mechanical and biological filtration systems 40 and 42, respectively, may be provided as a single unitary filter. Further, it is contemplated for filtration system 30 to include an oxygenation system to transfer oxygen into water 19 to maintain the oxygen in water 19 at an optimal level. In addition, since it is difficult for filtration systems to remove all waste products from water 19 during the treatment process, adding clean, fresh water 19 to interior 18 of tank 14 is often desirable.

In order to feed larval fish 12 in tank 14, a food distribution mechanism 56 is provided. Food distribution mechanism 56 is supported at a desired location by support 58. Support 58 may include a first end 60 engageable with support surface 21 and a second end 62 interconnected to food distribution mechanism 56 in any conventional matter. Support 58 may be adjustable to allow a user to precisely position food distribution mechanism 56 is the desired location. In the depicted embodiment shown in FIG. 1, support 58 supports food distribution mechanism 56 at a location vertically spaced from and aligned with a portion of the upper surface of water 19 in tank 14.

It is intended for food distribution mechanism 56 to distribute a portion of feedstock 64 received therein into water 19 in tank 14 to feed larval fish 12. More specifically, food distribution mechanism 56 distributes feedstock 64 at a desired rate and for a desired feeding cycle or time period (e.g., 0.5 to 10 minutes) at desired intervals (e.g., 2-8 times per day). By way of example, food distribution mechanism 56 may take the form of a compressed air feeder or an electrical/mechanical feeder. In a compressed air feeder, a compressor is provided which generates a supply of air which is normally shut off. Feedstock 64 is provided in a hopper mounted above a feedstock distribution pipe, which in turn, is placed over tank 14. Feedstock 64 is allowed to fall under gravity from an opening in the hopper into the feedstock distribution pipe. Feedstock 64 continues to fall until the opening in the hopper becomes blocked by the fallen feedstock 64. Upon actuation of compressor, air is introduced into the feedstock distribution pipe such that feedstock 64 is ejected from the feedstock distribution pipe into tank 14. The amount of feedstock ejected is dependent upon the diameters of the feedstock distribution pipe and the hopper outlet, the length of time that the compressor is actuated and the force generated by the flow of compressed air through feedstock distribution pipe. Alternatively, in a electrical/mechanical feeder, feedstock 64 is ejected from a hopper into tank 14 by means of an electrical/mechanical ejection device. The amount of feedstock ejected is dependent upon the length of time that the electrical/mechanical ejection device is actuated, as well as, the size of the opening from which feedstock 64 is ejected from the hopper and the force from which feedstock 64 is ejected from the hopper.

In order to control the rate, the time period of the feeding cycle and the intervals at which feedstock 64 is distributed, food distribution mechanism 56 is operatively connected to controller 66. Controller 66 is configured to control the rate, the length or time period of feeding cycle, and the actuation of the food distribution mechanism 56 at selected intervals. It can be appreciated that operating instructions for controller 66 may be provided thereto in any conventional manner, such as through one or more input devices. More specifically, each of one or more input devices may take the form of dials, switches, touch pads, keyboards and the like, it is contemplated for a user to utilize the one or more input devices to set the distribution rate of feedstock 64, the length or time period of the feeding cycle, and the intervals at which controller 66 actuates food distribution mechanism 56 causing feedstock 64 to be distributed into water 19 in tank 14.

Controller 66 is also operatively connected to light source 68. Light source 68 is interconnected to and supported by support 58. Light source 68 includes a laser beam generator 69 which generates laser beam 70 at a selected wavelength in response to instructions from controller 66. By way of example, laser beam generator 69 may take is the form of a red-beam laser emitting a laser beam having a wavelength in the range of 600 and 700 nanometers. Alternatively, laser beam generator 69 may take the form of a green-beam laser emitting a laser beam having a wavelength in the range of 490 and 560 nanometers. It is noted that laser beams of other wavelengths are possible without deviating from the scope of the present invention.

Laser beam generator 69 emits laser beam 70 towards upper surface 72 of diffuser 74. Diffuser 74 expands laser beam 70 into a well-defined, predetermined pattern of diffused light 76 directed at water 19 within interior 18 of tank 14, for reasons hereinafter described. It is intended for controller 66 to be configured to control the length or time period, as well as, the points in time that light source 68 emits diffused light 76. It can be appreciated that a user may provide instructions to controller 66 for controlling the operation thereof in any conventional manner, such as through the one or more input devices heretofore described. In other words, it is contemplated for a user to utilize the one or more input devices to set the length of the time period that light source 68 emits diffused light 76 and the points in time that light source 68 emits diffused light 76.

In operation, tank 14 is stocked with larval fish 12 and water 19 in tank 14 is circulated through filtration system 30, as heretofore described, to optimize the environment within tank 14 for the larval fish 12. In order to feed larval fish 12, feedstock 64 is loaded into the hopper of food distribution mechanism 56 and the user selects the type of laser beam generator 69 (either a red-beam laser or green-beam laser) for emitting laser beam 70. The type of laser beam generator 69 may be at least partially dependent on the species of the larval fish 12 received in tank 14, since a particular species of fish may react different to light of different wavelengths. Thereafter, the user utilizes the one or more input devices to controller 66 to set the rate of distribution of feedstock 64 from food distribution mechanism 56 during a feeding cycle, the length of time of the feeding cycle (i.e., the time period that feedstock 64 is distributed from food distribution mechanism 56) and the intervals at which controller 66 actuates food distribution mechanism 56 causing feedstock 64 to be distributed into water 19 in tank 14. It is contemplated for the rate of distribution of feedstock 64 from food distribution mechanism 56 during a feeding cycle, the length of the feeding cycle and the intervals between the feeding cycles selected by the user to be at least partially dependent on the species of the larval fish 12 received in tank 14.

The user may also utilize the one or more input devices to set the points in time at which light source 68 is actuated and the duration of time that actuated light source 68 emits laser beam 70. It is contemplated for light source 68 to be actuated shortly after the beginning start of the feeding cycle. It is noted that points in time when light source 68 is actuated and the duration of time that actuated laser beam generator 69 of light source 68 emits laser beam 70 may be at least partially dependent on the species of the larval fish 12 received in tank 14.

Once a feeding cycle has begun, controller 66 causes food distribution mechanism 56 to distribute feedstock 64 at the rate selected by the user for the entirety of the feeding cycle. It is contemplated that a variable distribution rate may be provided with a single feeding cycle. Upon actuation of food distribution mechanism 56 or after a selected delay, controller 66 actuates light source 68 in accordance with the user's instructions such that laser beam generator 69 of light source 68 emits laser beam 70. Laser beam 70 passes through diffuser 74 such that diffuser 74 expands laser beam 70 into a well defined, predetermined pattern of diffused light 76 directed to water 19 within interior 18 of tank 14. Diffused light 76 illuminates feedstock 64 distributed into tank 14, as heretofore described. It has been found that illumination of feedstock 64 with diffused light 76 enhances the feeding response of larval fish 12 to feedstock 64, thereby causing larval fish 12 to more readily feed on the artificial feedstock 64. Laser beam generator 69 of light source 68 continues to emit laser beam 70 until terminated by controller 66 in accordance with the user's instructions. Termination of light beam 70 may occur in prior to or after termination of the feeding cycle. Thereafter, the process is repeated at subsequent points in time in accordance with the user's instructions provided to controller is 66.

Figure 2:
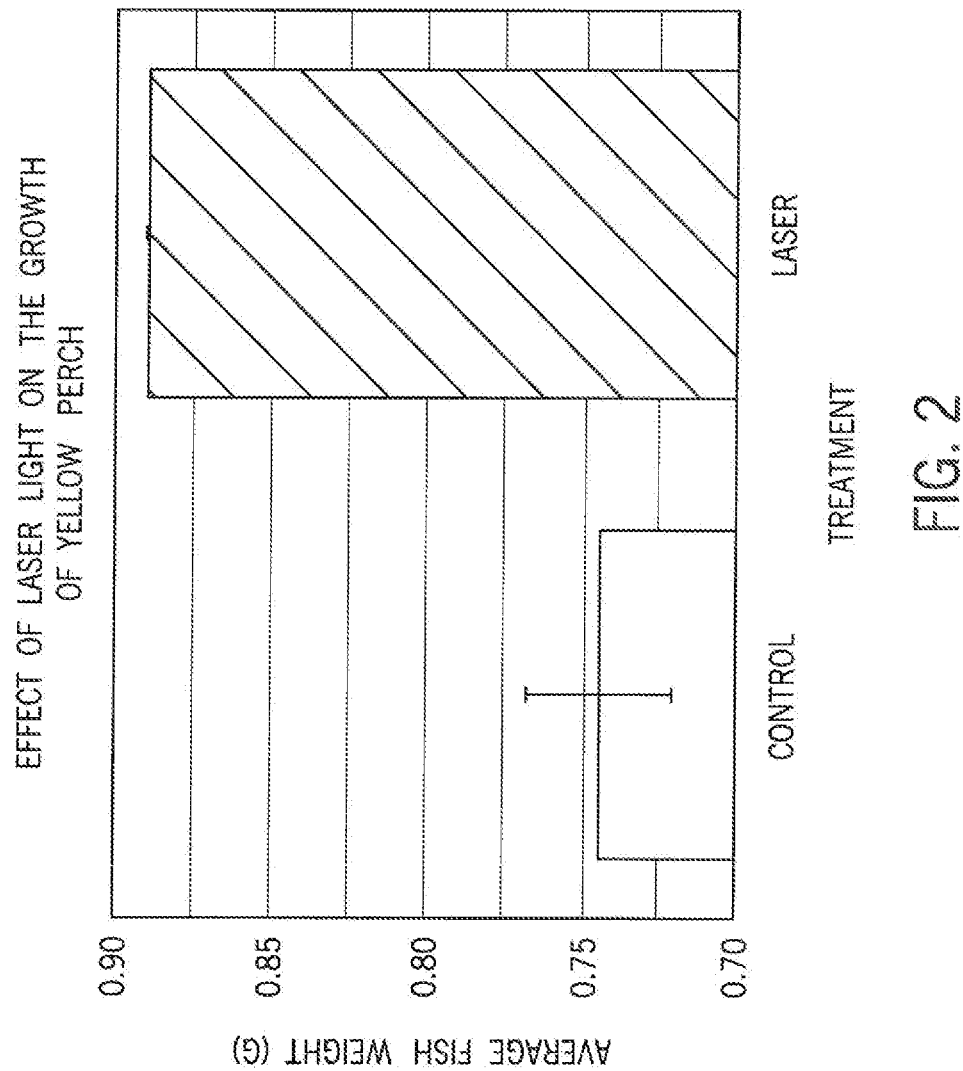
FIG. 2 is a graphical representation showing the effects of utilizing the device and methodology of the present invention to feed yellow perch versus a standard feeding process.

Referring to FIG. 2, a graphical representation showing the effects of utilizing the device and method of the present invention to feed larval yellow perch versus a standard feeding process (namely, the "control") is depicted. More specifically, duplicate 60-gallon tanks containing approximately 1,200 larval yellow perch were provided. The larval yellow perch in each tank were fed eight (8) times per day utilizing conventional food distribution mechanisms. In accordance with the present invention, upon actuation of the food distribution mechanisms, a controller illuminated a light source directed at one of the tanks such that a laser beam generator of the light source emitted a laser beam. The laser beam passed through a diffuser such that the diffuser expanded the laser beam into a well-defined, predetermined pattern of diffused light directed at the water within the interior of the tank at which the light source was directed. The light source, and hence the diffused light, illuminated the noted tank and the feed particles distributed by the food distribution mechanism for a period of two minutes. It is noted that the larval yellow perch within the tank illuminated by the device of the present inventions were approximately 15% larger by weight, than those larval yellow perch in the other "control" tank which were fed without illumination of the tank and the feed particles. The results indicate that the larval yellow perch in the tank utilizing the device and method of the present invention ate more feed particles than the larval yellow perch in the "control" tank which were fed in accordance with a standard feeding process.

Various modes of carrying out the invention are contemplated as being within the scope of the following claims particularly pointing out and distinctly claiming the subject matter that is regarded as the invention.

I claim:

1. A device for enhancing the feeding response of larval fish to feedstock, the larval fish receivable in a tank having water therein defining a water surface, comprising:
   a food distribution mechanism vertical spaced from the water surface adjacent the tank and adapted for receiving the feedstock therein, the food distribution mechanism configured to selectively deposit portions of the feedstock into the tank;
   a light source vertically spaced from the water surface adjacent the tank;
   a laser beam generated by the light source, the laser beam projecting along an axis in a first direction toward the water surface;
   a controller operatively connected to the food distribution mechanism and the light source, the controller configured to:
      actuate the food distribution mechanism for a time period at selected intervals such that the food distribution mechanism deposits a portion of the feedstock into the tank during each time period; and
      actuate the light source at one of the actuation of the food distribution mechanism and a selected time delay after actuation of the food distribution mechanism for at least a portion of each time period; and
   a diffuser positioned along the axis between the light source and the tank and being adapted for receiving the laser beam, the diffuser being configured to diffuse the laser beam into a diffuse beam with a desired pattern for illuminating the portions of feedstock in the tank;
   wherein the laser beam is collimated and coherent.

2. The device of claim 1 further comprising a support operatively connected to the food distribution mechanism and the light source for supporting the food distribution mechanism and the light source at a location above a water level of water received in the tank.

3. The device of claim 1 wherein the laser beam emitted by the light source has a predetermined wavelength in the range of 600 and 700 nanometers.

4. The device of claim 1 wherein the laser beam emitted by the light source has a predetermined wavelength in the range of 490 and 560 nanometers.

5. The device of claim 1 wherein each time period is in the range of 0.5 and 10 minutes.

6. The device of claim 1 wherein each time period has a starting point and wherein the light source is actuated by the controller at points in time spaced from the starting point of each time period.

7. The device of claim 1 wherein the larval fish are of a species and wherein each time period has a length, the length of each time period being dependent on the species of the larval fish received in the tank.

8. The device of claim 1 wherein each interval has a length, the length of each interval being dependent on the species of the larval fish received in the tank.

9. A device for enhancing the feeding response of larval fish to feedstock, the larval fish receivable in a tank having water therein defining a water surface, comprising:
   a food distribution mechanism vertically spaced from the water surface adjacent the tank and adapted for receiving the feedstock therein, the food distribution mechanism configured to selectively deposit portions of the feedstock into the tank for a time period;
   a light source vertically spaced from the water surface adjacent the tank;
   a laser beam generated by the light source, the laser beam directed along an axis in a first direction toward the water surface during at least a portion of the time period;
   a controller operatively connected to the food distribution mechanism and the light source, the controller configured to:
      actuate the food distribution mechanism to deposit a portion of the feedstock into the tank during for the time period; and
      actuate the light source at one of the actuation of the food distribution mechanism and a selected time delay after actuation of the food distribution mechanism; and
   a diffuser positioned along the axis between the light source and the tank, the diffuser configured to diffuse the laser beam into a diffuse beam with a desired pattern so as to illuminate the portions of feedstock in the tank;
   wherein the laser beam is collimated and coherent.

10. The device of claim 9 wherein the controller is configured to actuate the food distribution mechanism for the time period at selected intervals such that the food distribution mechanism deposits a portion of the feedstock into the tank during each time period.

11. The device of claim 9 further comprising a support operatively connected to the food distribution mechanism and the light source for supporting the food distribution mechanism and the light source at a location above a water level of water received in the tank.

12. The device of claim 9 wherein the laser beam emitted by the light source has a predetermined wavelength in the range of 600 and 700 nanometers.

13. The device of claim 9 wherein the laser beam emitted by the light source has a predetermined wavelength in the range of 490 and 560 nanometers.

14. The device of claim 9 wherein each time period is in the range of 0.5 and 10 minutes.

15. The device of claim 9 wherein the larval fish are of a species and wherein the time period has a length, the length of the time period being dependent on the species of the larval fish received in the tank.

16. A method of enhancing the feeding response of larval fish to feedstock, the larval fish receivable in a tank, comprising the steps of:
   selectively depositing the feedstock into water in the tank from a location vertically spaced from the water for a time period;
   selectively directing a laser beam at the water in the tank at one of the depositing the feedstock into that water in the tank and at a selected time delay after depositing the feedstock into water in the tank for at least a portion of the time period, the laser beam traveling along an axis in a first direction;
   positioning a diffuser along the axis to receive the laser beam; and
   redistributing the laser beam with the diffuser into a diffuse beam with a desired pattern for illuminating the feedstock in the tank;
   wherein the laser beam is collimated and coherent.

17. The method of claim 16 wherein the step of selectively depositing the feedstock into the tank includes the additional step of actuating a food distribution mechanism for the time period at selected intervals such that the food distribution mechanism deposits a portion of the feedstock into the tank during each time period.

18. The method of claim 17 wherein the step of selectively directing the laser beam at the tank device includes that step of actuating a light source for at least the portion of each time period.

19. The method of claim 18 comprising the additional step of supporting the food distribution mechanism and the light source at a location above the of water received in the tank.

20. The method of claim 16 wherein the laser beam has a predetermined wavelength in the range of 600 and 700 nanometers.

21. The method of claim 16 wherein the laser beam has a predetermined wavelength in the range of 490 and 560 nanometers.

22. The method of claim 16 wherein the time period is in the range of 2 and 10 minutes.

23. The method of claim 16 wherein the larval fish are of a species and wherein the time period has a length, the length of the time period being dependent on the species of the larval fish received in the tank.

* * * * *